(12) United States Patent
Talwalkar et al.

(10) Patent No.: US 7,120,402 B2
(45) Date of Patent: Oct. 10, 2006

(54) METHOD AND APPARATUS FOR A HIGH PERFORMANCE AND HIGH DYNAMIC RANGE BASEBAND POWER CONTROL SYSTEM

(75) Inventors: Sumit A. Talwalkar, Plantation, FL (US); Mahibur Rahman, Lake Worth, FL (US); Steven P. Hoggarth, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 400 days.

(21) Appl. No.: 10/790,516

(22) Filed: Mar. 1, 2004

(65) Prior Publication Data

US 2005/0191975 A1    Sep. 1, 2005

(51) Int. Cl.
*H01Q 11/12* (2006.01)
(52) U.S. Cl. .............................. 455/127.4; 455/127.3; 455/127.2; 455/126; 455/115.1
(58) Field of Classification Search ............. 455/127.1, 455/127.2, 127.3, 127.4, 127.5, 126, 115.1, 455/115.2, 67.11; 375/296, 297
See application file for complete search history.

(56) References Cited

U.S. PATENT DOCUMENTS

| 5,590,418 | A | * | 12/1996 | Holoubek et al. .......... 455/126 |
| 5,722,056 | A | * | 2/1998 | Horowitz et al. ........ 455/115.2 |
| 6,118,811 | A | | 9/2000 | Narume et al. ............. 375/219 |
| 6,334,050 | B1 | * | 12/2001 | Skarby .................... 455/67.11 |
| 6,606,483 | B1 | * | 8/2003 | Baker et al. ............. 455/127.4 |
| 6,885,241 | B1 | * | 4/2005 | Huang et al. ............... 375/296 |
| 6,987,954 | B1 | * | 1/2006 | Nielsen ................... 455/114.2 |

\* cited by examiner

*Primary Examiner*—Lana Le
(74) *Attorney, Agent, or Firm*—John A. Fortkort; Fortkort & Houston, P.C.

(57) ABSTRACT

A method and system controls transmit power by combining the advantages of digital attenuation and analog baseband step attenuators by calibration to overcome the limitations of analog step attenuators. The calibration technique uses highly accurate digital attenuators to determine the actual sizes of the analog steps as analog step attenuator is stepped through a range of attenuation levels. A method of calibration accurately measures attenuation steps comparison to a digital attenuator so that the attenuation actually realized by the analog step attenuator is accurately known. Therefore, the difference between the attenuation realized by the analog step attenuator and the desired attenuation is accurately known. The difference is realized in the digital attenuator and the attenuation resulting from the composite of the digital and analog step attenuator can very accurately realize the requested attenuation.

23 Claims, 7 Drawing Sheets

METHOD AND APPARATUS FOR A HIGH PERFORMANCE AND HIGH DYNAMIC RANGE BASEBAND POWER CONTROL SYSTEM

FIELD OF THE INVENTION

This invention pertains to wireless technologies, and more particularly, to control the power radiated by a radio frequency transmitter.

BACKGROUND OF THE INVENTION

Cellular communications systems often require that the radiated power from the transmitter be tightly controlled. Controlling the transmit power levels has several advantages. First, control allows minimizing the transmitted power which allows the overall power consumed by the cellular radio can be reduced. This reduction extends battery life which is an important metric in design of cellular handsets. Power control is also required for closed loop power control between the base station and the mobile device for system functionality in Code Division Multiple Access (CDMA) systems, as necessitated by the protocol used.

Controlling the transmitted power also has the affect of reducing the interference level in a cellular system. Often the total number of users in a cellular system is interference limited. In an interference-limited system the performance of any given communications link is limited by the interference generated by the transmitted signals of the many other communications links in use in the cellular system. If all transmitted signals in the cellular system are controlled to more accurately transmit at appropriate levels necessary to establish a given quality of service, then the total interference will also be minimized. By minimizing the total interference level generated by each communications link, the total number of communications links can be increased. However, increased accuracy typically cannot occur without increased cost.

In general, tightly controlling the transmitted power level is not trivial. One technique commonly used to control the transmit power is to use a digital multiplier to adjust the transmit power level while the signal is still represented digitally. The digital multiplier allows very precise control of transmit power and is very economical in both silicon area and power consumption. However, because the digital signal must be converted to an analog signal before transmission, attenuation occurs before a digital to analog conversion. Digital to analog converters usually have a limited dynamic range and extending the dynamic range of the converters is expensive. By placing a digital multiplier before the digital to analog converter, the dynamic range of the converter must be increased by at least the amount of the desired control range of the transmit signal. The increase in dynamic range of the digital to analog converter is, therefore, usually expensive and increases the power consumption of the digital to analog converter to a prohibitive extent.

A second method commonly used to vary transmit power levels is the use of voltage controlled amplifiers (VCA) in the RF portion of the radio. VCAs are placed after the digital to analog converters and therefore do not affect the required dynamic range of these devices. However, VCA's require a great deal of power to operate at high frequencies and occupy a large area.

A third method employed to control transmit power involves analog step attenuators. Analog "baseband" step attenuators have low power drain and can be realized in a small area. However, analog step attenuators tend to be inaccurate and do not allow the small steps or fine granularity in attenuation required by current cellular standards to meet transient adjacent channel leakage specifications.

Therefore, a need exists for a transmit power control system which simultaneously realizes small steps in attenuation, achieve great accuracy, consume little power, and occupies a small area.

BRIEF SUMMARY OF THE INVENTION

The invention provides a method and apparatus for realizing a system to control transmit power which simultaneously allows high accuracy, small area, and low power consumption.

The invention combines the advantages of digital attenuation and analog baseband step attenuators by using a novel method of calibration to overcome the limitations of analog step attenuators. The calibration technique uses highly accurate digital attenuators to determine the actual sizes of the analog steps as analog step attenuator is stepped through a range of attenuation levels.

With the analog step attenuator characterized in this manner, any attenuation over a large range can be realized. For example, when a given large attenuation is requested, the majority of this attenuation can be realized in the analog step attenuator. In general, however, the analog step attenuator still has a limited number of attenuation levels and thus, a very coarse granularity. Therefore, it will not be able to realize the requested attenuation exactly. Also, the coarse granularity steps that analog attenuators have will not meet transient adjacent channel leakage specifications when ramping up or down with such larger steps.

Because the attenuation steps have been accurately measured by comparison to the digital attenuator, the attenuation actually realized by the analog step attenuator is accurately known. Therefore, the difference between the attenuation realized by the analog step attenuator and the desired attenuation is accurately known. Because the difference is accurately known, the difference can be realized in a digital attenuator and the attenuation resulting from the composite of the digital and analog step attenuator can very accurately realize the requested attenuation.

The majority of the requested attenuation is realized in an analog step attenuator. Thus, after the digital to analog converter, the present invention does not require a significant increase in the dynamic range for conversion of this converter. Further, the analog step attenuator and digital attenuator do not require large area and can be low power devices. Finally, the combination realizes an accurate attenuation with very fine granularity in attenuation by using very fine precision steps.

Other aspects, objectives and advantages of the invention will become more apparent from the following detailed description when taken in conjunction with the accompanying drawings.

DETAILED DESCRIPTION OF THE INVENTION

Figure 1:
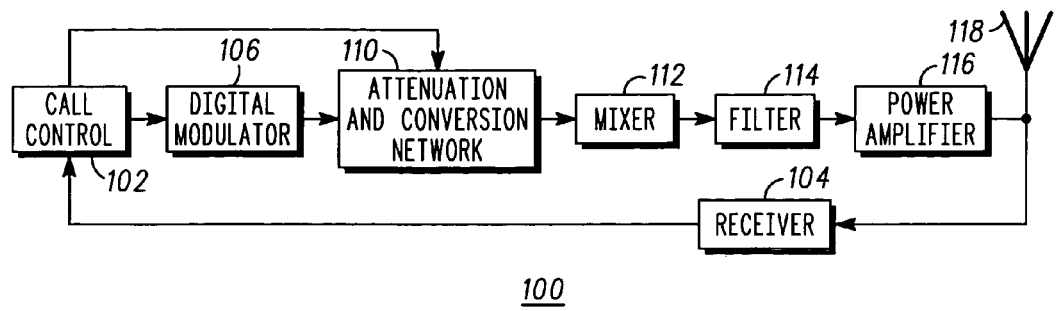
FIG. 1 is a block diagram of an exemplary digital cellular transceiver in accordance with embodiments of the present invention.

Referring now to FIG. 1, a block diagram of a transmitter 100 incorporating the self calibrating attenuator is shown. The transmitter includes call control block 102. Call control block 102 provides control of the remainder of the transmitter, provides the digital information transmitted by the radio, interprets signaling information from receiver 104 such as power control signals, and generates signaling information for the transmitter. The digital information from call control block 102 is passed into digital modulator 106 where the digital information is transformed into a digital baseband signal. Digital baseband signal is input into attenuation and conversion block 110 where the level of digital baseband signal is decreased by some predetermined value and the signal is converted from a digital to an analog signal and filtered to limit the spectral content of the analog signal. Attenuation and conversion block 110 is also coupled to control block 102 which allows control, status, and level information to be exchanged between the two blocks.

The output of attenuation and conversion block 110 is coupled to mixer 112 which shifts the center frequency of the analog baseband to a frequency appropriate for transmission. The output of mixer 112 is filtered by filter 114 to remove undesirable products from mixer 112. The output of filter 114 is an input to power amplifier 116. Power amplifier 116 increases the power level of the filtered signal. The output of power amplifier 116 is coupled to antenna 118. Antenna 118 increases the efficiency with which the signal at the output of power amplifier 116 is radiated into the environment.

Figure 2:
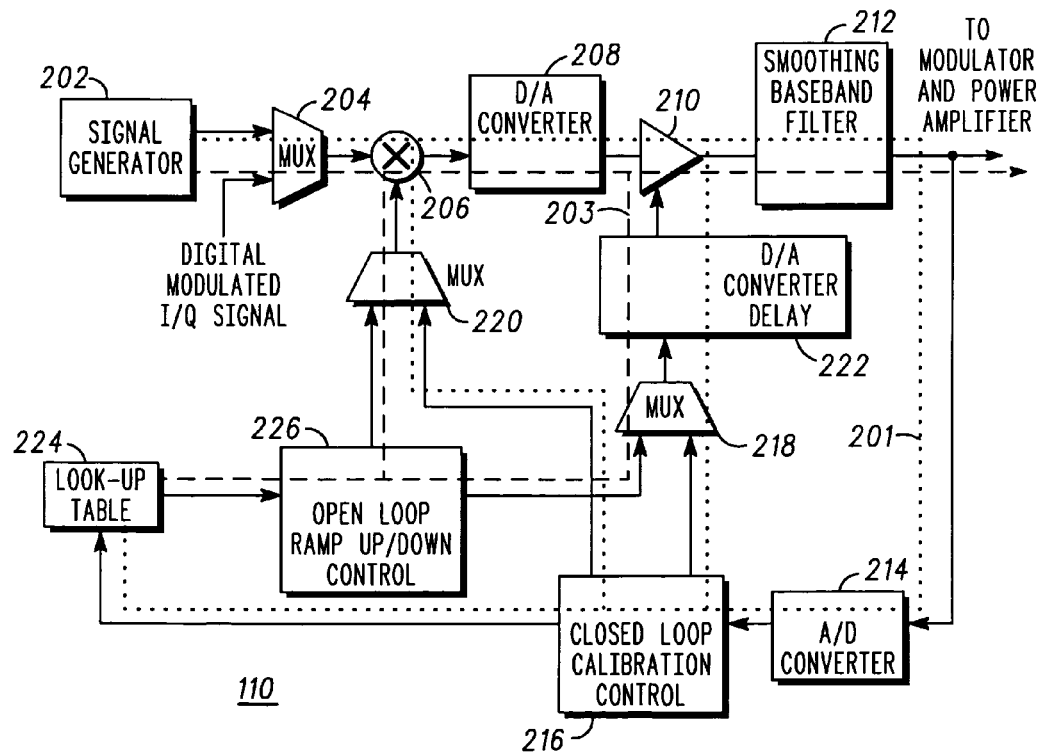
FIG. 2 is a block diagram of a two stage calibrated attenuator and associated circuitry in accordance with an embodiment of the present invention.

FIG. 2 shows a detailed block diagram of attenuation and conversion block 110 and gives an exemplary block diagram of a dual stage calibrated attenuator in accordance with an embodiment. The attenuation and conversion block operates in two modes, the calibration mode shown in dotted lines 201 and the normal mode shown in dashed lines 203. In the calibration mode, a signal is created in signal generation unit 202. Signal generation unit 202 is coupled to multiplexer 204, which is set to pass the generated signal to digital attenuator 206.

Digital attenuator 206 changes the level of the generated signal by a programmable value. The signal as modified is passed to DAC 208 which converts the signal to an analog value, the level of which is a function of the digital input. The output of DAC 208 is coupled to analog step attenuator 210.

Analog attenuator 210 changes the level of DAC 208 output by a programmed amount. The output of analog step attenuator 210 is coupled to baseband filter 212 which removes spurious out-of-band signals including those generated by DAC 208.

The output of baseband filter 212 is coupled to analog to digital converter (ADC) 214. ADC 214 transforms the instantaneous voltage level at the input to a digital equivalent. The output of ADC 214 is coupled to calibration control block 216.

Calibration control block 216 compares the level at the output of ADC 214 to the known level produced by signal generation unit 202 to determine the actual change in attenuation that occurs when a change occurs in the attenuation of analog step attenuator 210. Details of this procedure are described below.

Calibration control block 216 is coupled to multiplexers 218 and 220. Calibration control block 216 provides both a signal selection and an input to multiplexers 218 and 220. If in calibration mode, mulitiplexers 218 and 220 select the direct input from calibration control block 216. For multiplexer 220, a selection passes the digital value created by the calibration control block to digital attenuator 206. For multiplexer 218, the signal created by calibration control block 216 passes to DAC delay 222 which realizes the same delay as DAC 208. The delay effectively applies changes in attenuation realized in digital attenuator 206 and the analog step attenuator 210 to the signal at the same point and, therefore, avoids large transient changes in attenuation.

Calibration control block 216 is further coupled to look up table (LUT) 224 and open loop ramp control 226. LUT 224 stores the results of the calibration while the open loop ramp control 226 controls the application of attenuation as is detailed below.

The normal mode operates by transmitting signals, and calibration mode operates by calibrating analog step attenuator 210. In the calibration mode, multiplexer 204 is set to pass the output of the calibration signal generator unit 202 to digital attenuator 206.

The output of digital attenuator 206 is coupled to digital to analog converter (DAC) 208. DAC 208 converts the digital signal to an analog signal at a level which is a function of the digital input. The output of DAC 208 is coupled to the input of analog step attenuator 210. Analog step attenuator 210 reduces the signal level by a programmable amount.

The output of analog step attenuator 210 is coupled to baseband filter 212. Baseband filter 212 removes out-of-band frequency components including image products generated by DAC 208.

During normal operation, the transmit power changes in accordance with signals received by receiver 104 and processed by control block 102. Control block 102 generates a requested change in transmit power level and passes this requested change to attenuation and conversion block 110. Internal to block 110, the requested change in attenuation passes to ramp control block 226. The ramp control block 226 changes the attenuation in a series of small steps to realize the requested change in attenuation. The process includes changing the digital attenuation until the change reaches a value that can be accommodated by analog step attenuator 210.

Analog step attenuator 210 accommodates steps determined during the calibration mode. The steps are available to ramp control block 226 by an operative coupling to LUT 224. Realizing the change in attenuation by a series of small steps results in a minimum of spectral distortion which is often necessary to meet standards for transient adjacent channel power in many cellular standards.

The goal of calibration mode is to accurately determine the change in attenuation that occurs in the analog step attenuator 210 when attenuator 210 steps through the entire range of attenuations. Analog step attenuators are typically controlled by a digital signal. The digital signal controls the attenuation level realized in analog step attenuator 210 by controlling switches that select different configurations of resistors in a resistive dividing network.

The use of resistors in a dividing network limits the number of discrete attenuation values that can be realized and further limits the accuracy of the realized steps. Although the absolute accuracy of the steps is limited, these steps are very repeatable implying that each time a given attenuation is requested at the controlling digital signal nearly the same value will be realized. Therefore, if the attenuation at each point requested by the controlling digital input is determined, the absolute attenuation level can be determined, stored, and corrected as detailed below.

In many digital cellular systems power control is implemented to minimize transmit power. Power control minimizes transmit power and, if accurate, has the advantages of increasing battery life and minimizing the interference to other cellular devices in the same and surrounding cellular networks. Often power control is implemented by requesting that a transmitting device change the power level transmitted by a predetermined value. The request does not contain the absolute power level to be transmitted, but instead contains the amount by which the transmit power should be increased or decreased in a manner that is relative to current transmit power. Requesting a change in the transmit power level has the advantage that the absolute transmit power level need not be known.

Typically, the change in power level is requested with the goal of maintaining a given quality of service. For example, if a cellular phone is transmitting to a cellular base station, the base station will determine the signal to interference ratio of the received signal. This signal to interference ratio will be compared to some threshold determined to be necessary for the desired quality of service. If the signal to interference ratio is below this predetermined threshold, the base station will transmit a signal to the cellular phone requesting that the cellular phone increase the transmit power by a predetermined amount. If the signal to interference ratio is above the threshold, the base station will transmit a request to the cellular phone to decrease the transmit power by a second predetermined amount. Thus, accurate power control response to requested changes is paramount to maintaining quality of service.

Figure 3:
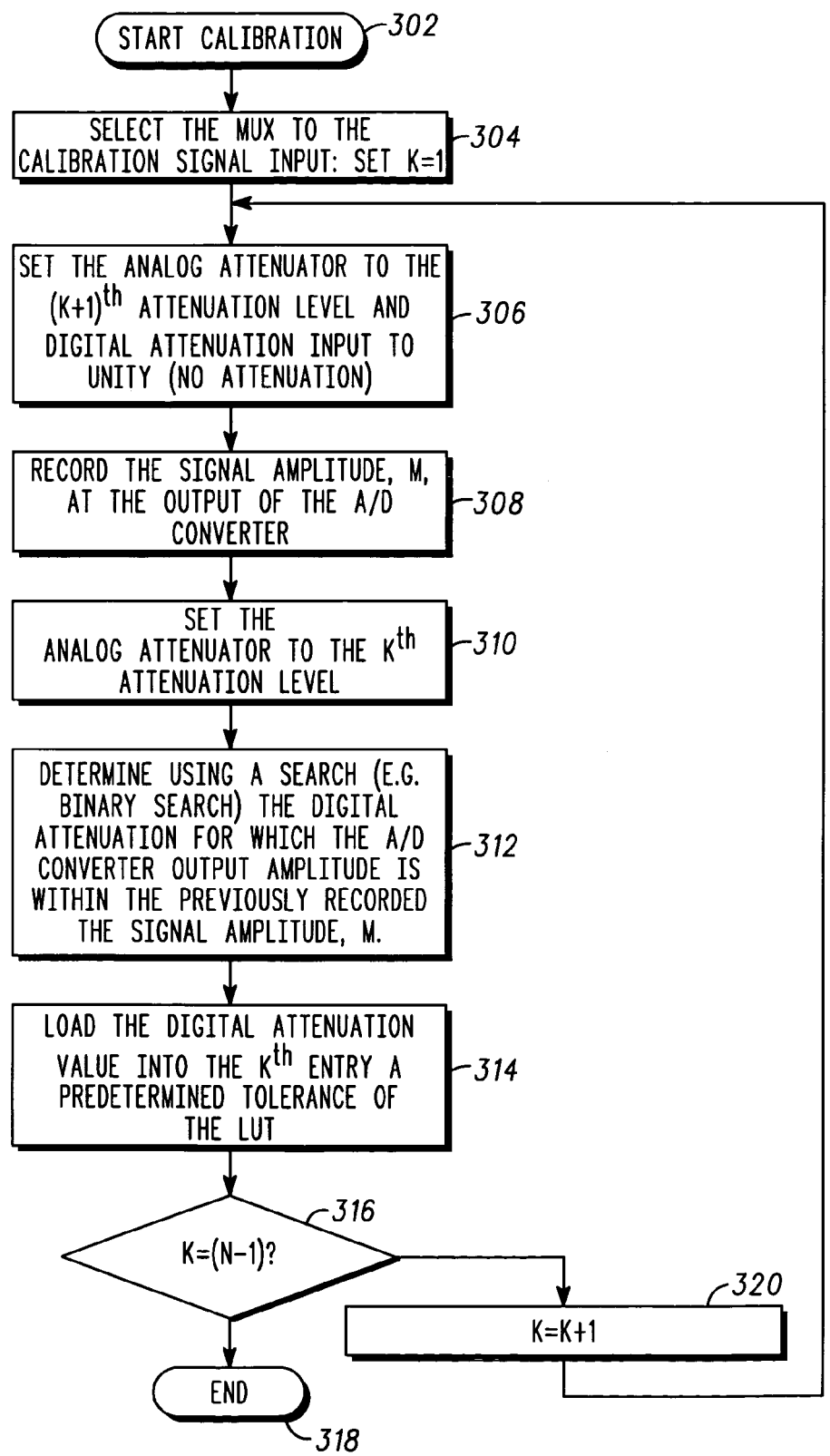
FIG. 3 is a flow diagram of the algorithm used to determine the change in attenuation between successive settings of an analog baseband attenuator in accordance with an embodiment of the present invention.

Referring to FIG. 3, a flow diagram illustrates an exemplary algorithm for calibration of analog step attenuator 210. Step 302 is the entry point of the algorithm. Step 304 provides that multiplexers 218 and 220 are set for calibration mode as described above. In calibration mode, digital attenuator 206 receives the calibration signal. Thus, calibration control block 216 directly controls both the digital and analog step attenuators 206 and 210, respectively. A counter maintained in the calibration algorithm, k, is set to 1. Step 306 provides for analog step attenuator 210 setting the level of attenuation to (k+1)st level. This attenuation corresponds to increasing the attenuation by one step. Further, digital attenuation is set to one. Setting digital attenuation to one corresponds to no attenuation.

Step 308 provides for measuring, recording, and storing the amplitude of the signal recorded by ADC 214. In an exemplary system, the measurement may involve averaging or otherwise filtering several samples of the ADC to reduce the effects of noise and to account for specific qualities of the calibration signal. Step 310 provides for setting the attenuation of the analog step attenuator 210 to the kth step. Step 312 provides for varying the attenuation of digital attenuator 206 and determining the signal level of ADC 214 after each change in digital attenuation level. The process continues until the value of digital attenuation necessary to cause the signal level measured at ADC 214 matches that found in step 308 to within a predetermined tolerance.

Step 314 provides for storing the value of digital attenuation found in step 312 in the kth entry of look up table 224. The stored value is the difference in attenuation of the analog step attenuator realize between the kth and (k+1)st attenuation step. Step 316 provides for checking the value of k to determine if all N−1 attenuation changes have been checked, where N is the number of attenuation steps available in analog step attenuator 210. If all values have been checked, the calibration algorithm ends in step 318. If more levels need to be calibrated, k is incremented in step 320 and control returns to step 306.

Figure 4:
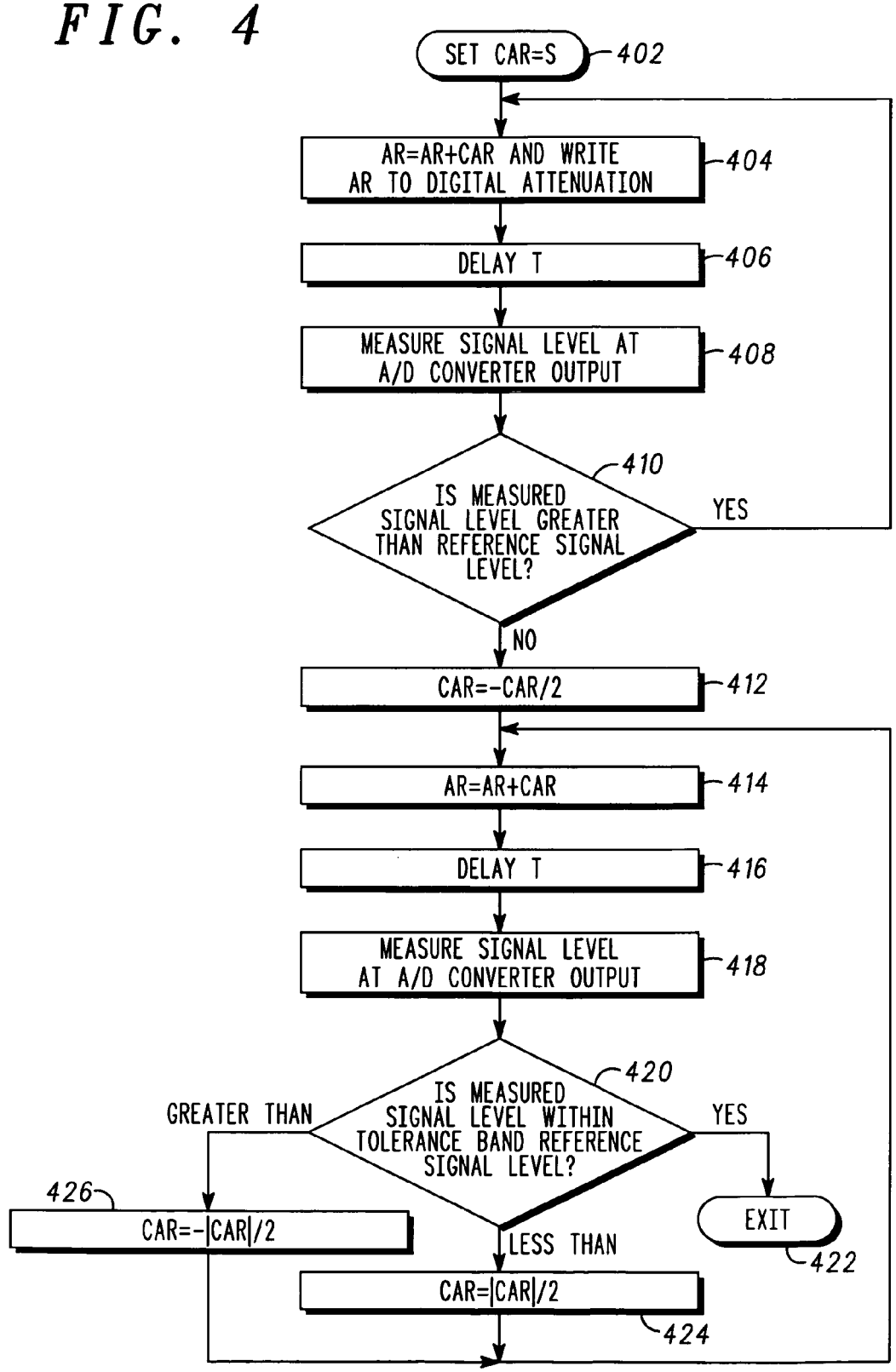
FIG. 4 is a flow diagram illustrating a modified binary search algorithm appropriate for implementing embodiments of the present invention.

The search mentioned in reference to 312 can be implemented using a modified binary search algorithm. Such a search algorithm is exemplified in FIG. 4. Step 402 sets the change in attenuation register (CAR) to S dB and the attenuation register to 0 where S is a positive value equal to the typical step size of the analog step attenuator. Step 404 adds the change in attenuation register to the attenuation register (AR) and writes the value in the attenuation register to the digital attenuator. Step 406 delays for a fixed period to allow the attenuated signal to propagate through the DAC, analog step attenuator, and baseband filter.

Step 408 provides for reading ADC 214 and determining the signal level. Step 410 compares the signal level measured in step 408 to that measured in step 308 above. If the signal level measured in step 408 is greater than that measured in step 308, control is passed back to step 404. If the new signal level measured in 408 is greater than the reference signal level measured in step 308, control is passed to step 412.

Step 412 provides for dividing the change in attenuation level by −2. Step 414 provides for adding the change in attenuation register to the attenuation register and writing the attenuation register to digital attenuator 206. Step 416 and 418 provide for delaying and measuring the signal level exactly as steps 406 and 408.

Step 420 provides for determining whether the measured signal level is within a fixed tolerance of the reference signal level measured in step 308, greater than the reference signal level plus the tolerance, or less than the reference signal level minus the tolerance.

If the signal level is within the fixed tolerance, the algorithm terminates in step 422. If the signal level is less than the reference signal level minus the tolerance than in step 424 the change in attenuation register is set to the absolute value of the present value of the change in attenuation register divided by 2. If the signal level is greater than the reference signal level plus the tolerance than in step 426 the change in attenuation register is set to the negative of the absolute value of the present value of the change in attenuation register divided by 2.

In the normal mode of operation, attenuation levels in both digital attenuator 206 and analog step attenuator 212 need to be changed according to the requests received from higher level control processors.

Figure 5:
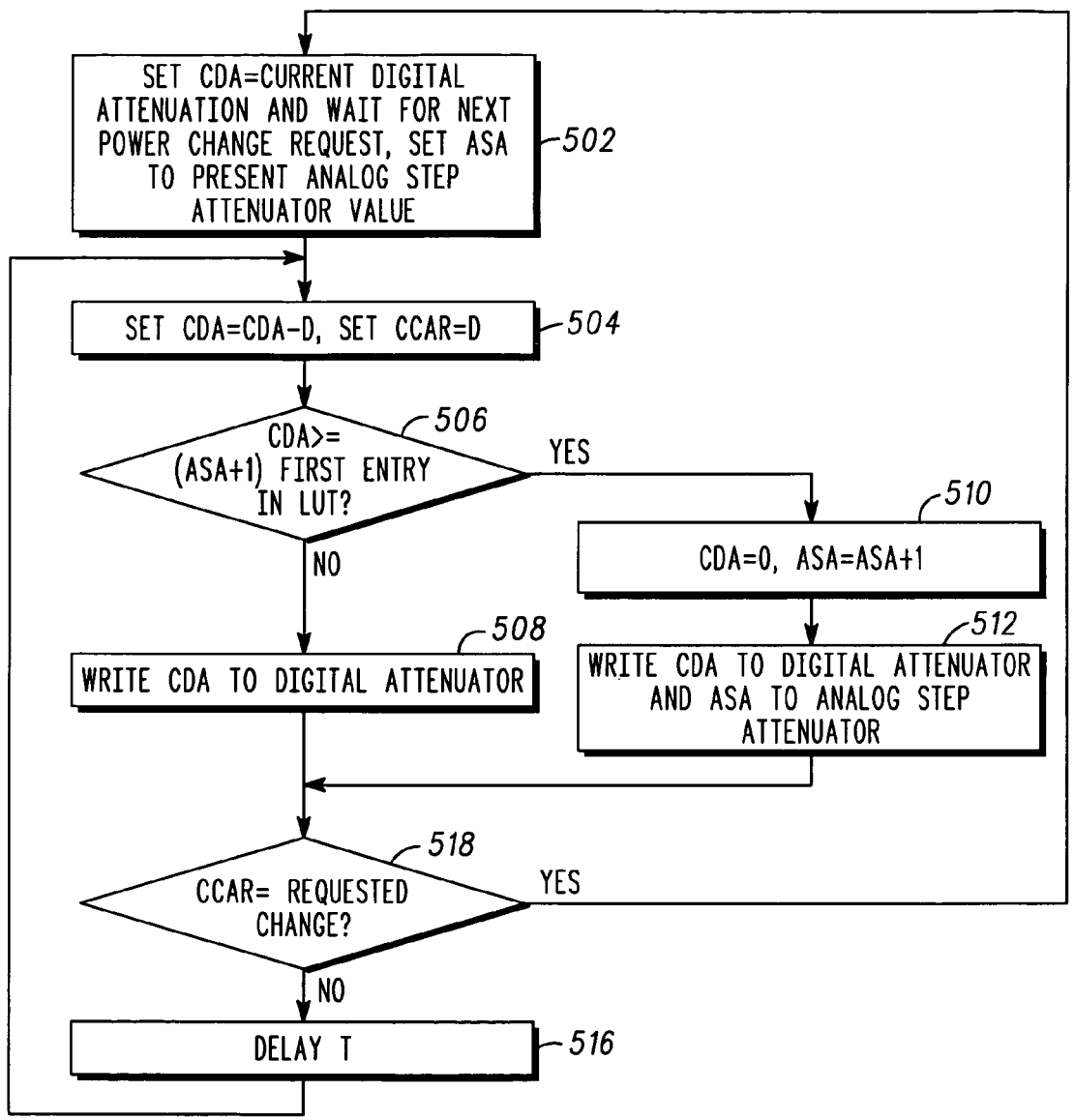
FIG. 5 is a flow diagram of the algorithm to increase attenuation of a two stage calibrated attenuator in accordance with an embodiment of the present invention.
Figure 6:
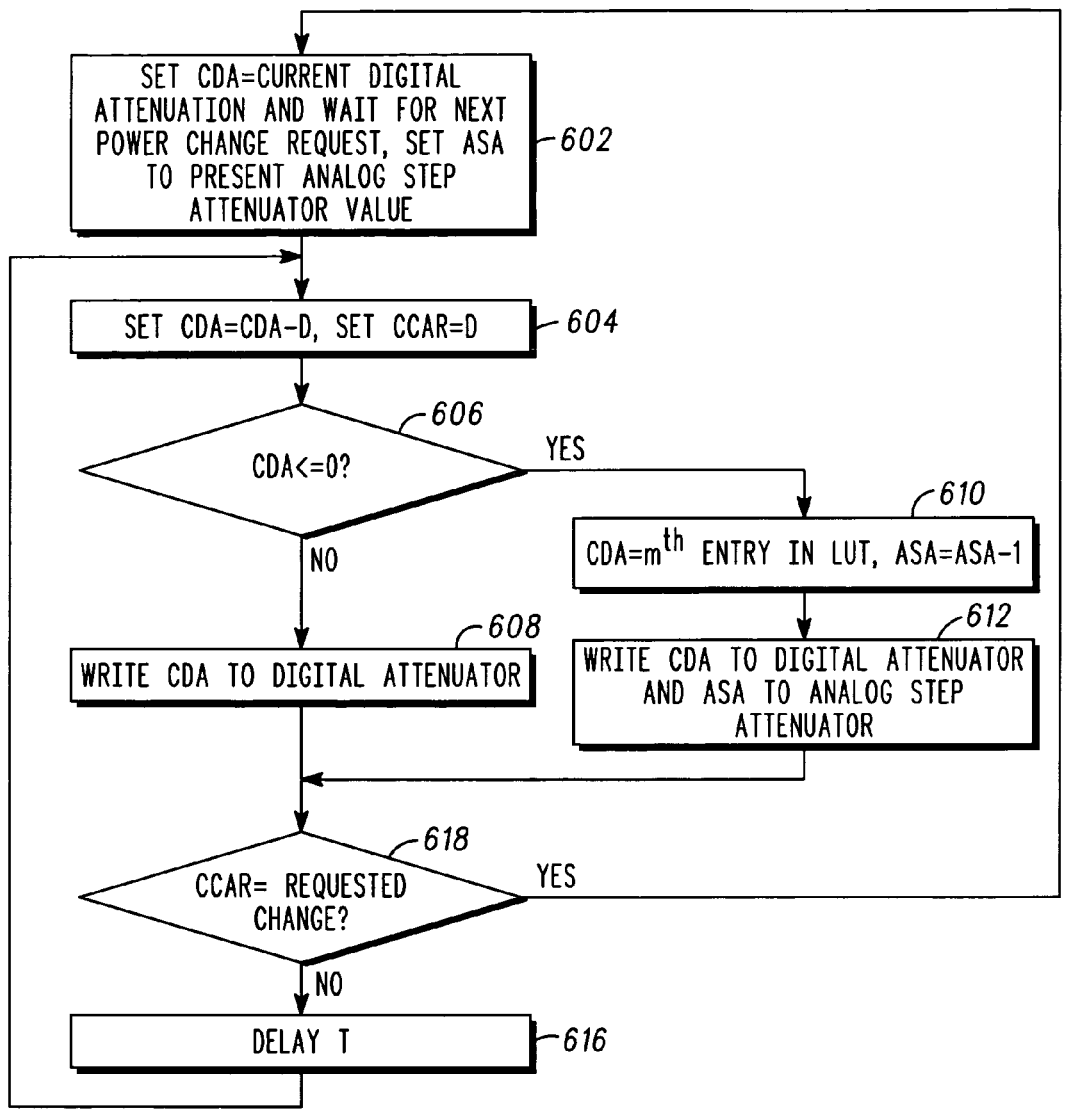
FIG. 6 is a flow diagram of the algorithm to decrease attenuation of a two stage calibrated attenuator in accordance with an embodiment of the present invention.

Referring now to FIG. 5, a flow diagram illustrates a method for achieving an increase in attenuation levels. FIG. 6 illustrates a method for achieving a decrease in attenuation levels. As shown, the method achieves as much of the requested attenuation as possible in analog step attenuator 210 using coarse analog steps to avoid the necessity to increase the dynamic range of DAC 208 as would be necessary if the entire attenuation is realized in the digital attenuator. Further, the method implements the change in attenuation in as gradual a manner as possible to avoid transient generation of adjacent channel power. Referring now to step 502, ramp control block 226 waits for a request to increase attenuation levels. Step 502 also provides for setting a current digital attenuation register (CDA) to the present value of digital attenuator 208 and sets the analog step attenuation register (ASA) to the current control value of the analog step attenuator. When this request is received, control moves to step 504 wherein the CDA is decremented by d. Further, step 504 provides for setting a value "d" in a cumulative change in attenuation register (CCAR). The value "d" represents a fixed predetermined value corresponding to one or more steps of digital attenuation. A step in digital attenuation is much smaller than a step in the analog step attenuator.

Decision block 506 provides for testing the CDA to determine whether the CDA is greater than or equal to the entry in LUT 224 representing analog step attenuator 210 (ASA) value plus one.

If the entry +1 is not greater than or equal to the ASA+1 entry, control passes to step 508 wherein the CDA is written to the digital attenuator 206. If the ASA+1 entry is greater than or equal to the ASA+1 entry, step 510 occurs. Step 510 provides for setting CDA to zero and setting ASA to ASA+1. Control is then passed to step 512 wherein the CDA is written to the digital attenuator and the ASA is written to delay block 222 which in turn feeds analog step attenuator 210.

Both steps 508 and 512 feed step 518 which provides for comparing the CCAR to the requested change in attenuation. If the requested increase in attenuation has been achieved, i.e. CCAR=requested change, control returns to step 502 which awaits the next request for an attenuation change. If the requested increase in attenuation has not yet been achieved, then control is passed to step 516 which delays execution for a period of T. Control is then returned to step 504 which begins the process of implementing the next step in attenuation.

The delay of T is necessary to allow the change in attenuation to take effect. The minimum value of T is the settling time as measured from the time that a change in attenuation is requested to the time at which that change has been realized to a desired degree of accuracy.

Referring now to FIG. 6, a flow diagram illustrates a method for a decreasing change in attenuation. Referring now to step 602, ramp control block 226 waits for a request to decrease attenuation levels. Step 602 also provides for setting a current digital attenuation register (CDA) to the present value of digital attenuator 208. When this request is received, control moves to step 504 wherein the CDA is decremented by d. Further, step 504 provides for setting a value "d" in a cumulative change in attenuation register (CCAR). The value "d" represents a fixed predetermined value corresponding to one or more steps of digital attenuation. A step in digital attenuation is much smaller than a step in the analog step attenuator.

Decision block 506 provides for testing the CDA to determine whether the CDA is greater than or equal to the entry ASA+1 in LUT 224 representing the difference in attenuation between the currently selected analog step attenuation and the next larger attenuation of the analog step attenuation.

If the entry +1 is not greater than or equal to the ASA+1 entry, control passes to step 608 wherein the CDA is written to digital attenuator 206. If the ASA+1 entry is greater than or equal to the ASA+1 entry, step 610 occurs. Step 610 provides for setting CDA to zero and setting ASA to ASA+1.

Control is then passed to step 612 wherein the CDA is written to the digital attenuator and the copy of the analog attenuation is written to the delay block which in turn feeds the analog step attenuator.

Both steps 608 and 612 feed step 618 which provides determines whether the CAR has achieved the requested decrease in attenuation, i.e., whether CAR=requested change. If not, control passes to step 616 which provides for introducing a delay of T to allow the change the change in attenuation to take effect. The minimum value of T is the settling time as measured from the time that a change in attenuation is requested to the time at which that change has been realized to a desired degree of accuracy. Following the delay of T, control returns to step 604 which begins the process of implementing the next step in attenuation.

If, step 618, the requested change in attenuation has been achieved, control passes to step 602 which awaits the next request for a decrease in attenuation.

The choice of the parameter d should be done to minimize the step size of each change in the attenuation value. The simplest method to achieve this result is to first determine the length of time which can be occupied by the total change in attenuation. "d" is then this total time multiplied by the requested step size and divided by the time required to implement a single step. One skilled in the art will appreciate that the algorithm as described implements a linear ramp in the attenuation. It is anticipated that in some applications a more complex function may be desired to further limit the transient adjacent channel power. One method to achieve more complex functions would be to change the parameter d during each iteration of the above method.

As an example, suppose that there N=5 analog attenuation steps with nominal values of 0, 2, 4, 6 and 8 dB. Suppose, in reality, the actual analog attenuation values are 0, 2.52, 3.61 5.87 and 8.12 dB, respectively. These actual attenuation values are shown in the second column of the table below. The third column shows the actual value of each step, which is calculated by subtracting the current analog attenuation value from the next value. For example, for the second row, the current attenuation value (column 2) is 2.52 whereas the next attenuation value is 3.61 dB. Thus, the actual difference is 3.61−2.52=1.09 dB. The final column lists the actual analog step size best approximated in terms the number of digital attenuations. The example assumes the digital attenuation size to be 0.1 dB. Then, the third analog step size of 2.26 dB (column 3) is best approximated as 23 units of a 0.1 dB digital attenuation.

| Step number (k) | Actual attenuation value A(k) | Actual difference (Step size) ΔA(k) | Actual difference approximated (step size) in terms of number of digital attenuations |
| --- | --- | --- | --- |
| 0 | 0 | 2.52 | 25 |
| 1 | 2.52 | 1.09 | 11 |
| 2 | 3.61 | 2.26 | 23 |
| 3 | 5.87 | 2.25 | 22 |
| 4 | 8.12 | | |

Note that the search conducted to find the fourth column (such as a binary search) allows for the fact that the actual analog attenuation will never exactly equal some units of digital attenuation. The approximation will be within a half of the size of the digital attenuation granularity (0.05 dB in the case of this example). Thus, the error of this approximation can be made insignificantly small with a choice of a small digital step size. Importantly, approximation error (typically less than 0.05 dB) is much smaller than the error between the actual analog step and its nominal value (typically as large as 0.5 to 1.0 dB).

Figure 7:
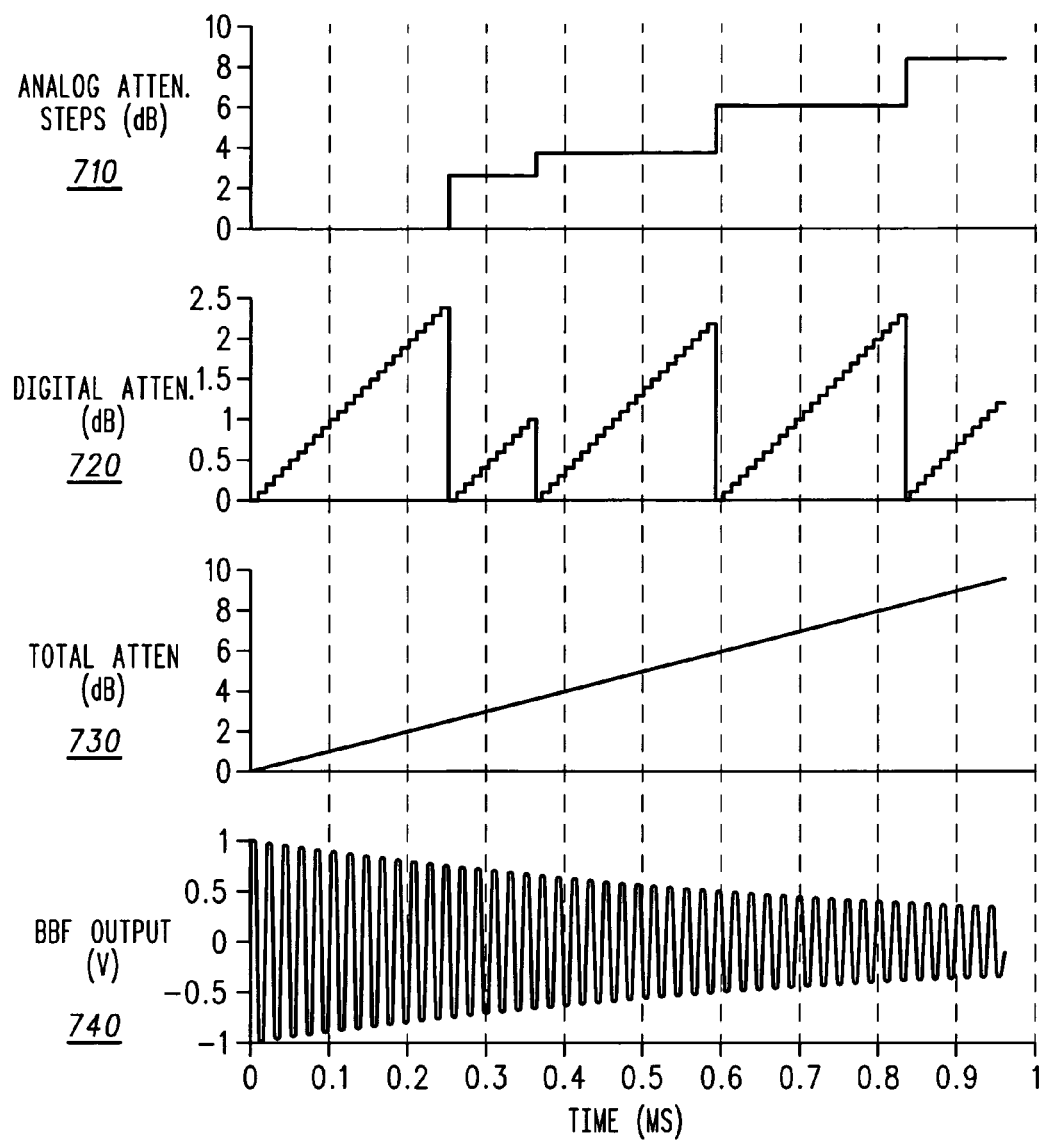
FIG. 7 is a series of subplots representing attenuator values for a ramp up in attenuation in a typical change in attenuation level in accordance with an embodiment of the present invention.
Figure 8:
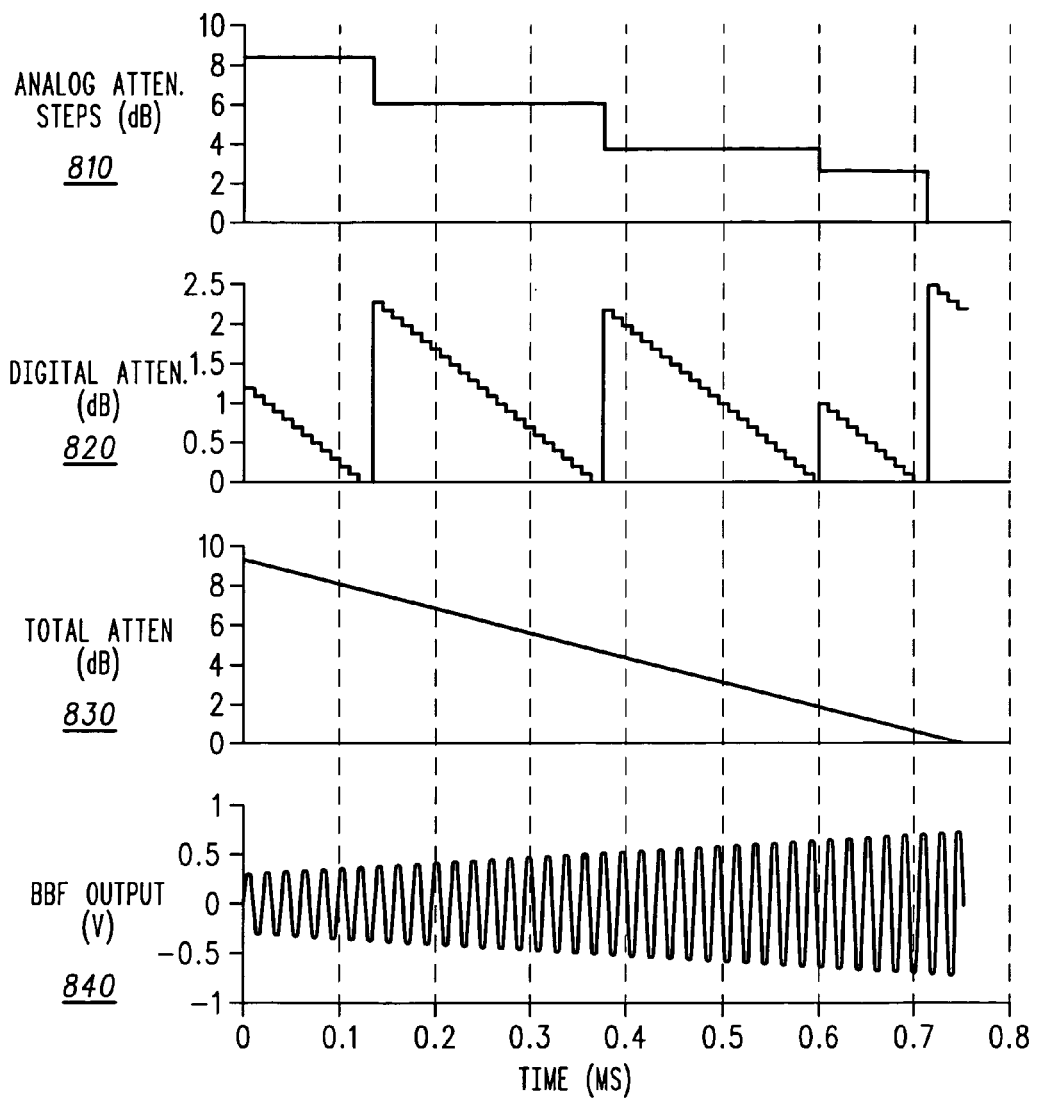
FIG. 8 is a series of subplots representing attenuator values for a ramp down in attenuation in a typical change in attenuation level in accordance with an embodiment of the present invention.

Referring now to FIGS. 7 and 8, graphs illustrate the output for an attenuation ramp up (FIG. 7) and an attenuation ramp down (FIG. 8), applying the example as illustrated above. For both FIGS. 7 and 8, the first subplots illustrating waveforms 710 and 820, shows the level of analog attenuation. The second subplots illustrating waveforms 810 and 820 illustrate the digital attenuation. The third subplots illustrating waveforms 730 and 830 illustrate total attenuation. For both waveforms 730 and 830, a smooth ramp is shown. The calibration step ensures that the total attenuation value follows a smooth ramp up or down. Finally, the filter output (BBF output) makes a graceful transition when the smooth total attenuation is applied. The final subplots illustrating waveforms 740 and 840 illustrate the final output signal with a sinusoidal input signal.

As shown in FIG. 7, analog attenuation steps shown in waveform 710 correspond to digital attenuation waveform 720, with units of digital increase in attenuation following the units of analog attenuation, such at time 0.25 and 0.59 ms. Waveforms 710 and 720 illustrate that when an analog attenuation step size is larger, there is a corresponding large number of digital attenuation steps and vice versa.

As shown in FIG. 8, there are more units of digital attenuation (y axis for wave form 820) corresponding to larger analog attenuation steps (y axis for wave form 810 at 2.52 dB and 2.26 dB). On the other hand, for a smaller analog attenuation step (1.09 dB as shown on the y axis of wave form 810), there are smaller number of digital attenuation steps as shown in wave form 820.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling transmit signals, the method comprising:
    calibrating an analog step attenuator by applying a digital attenuator to determine an accuracy in attenuation of the analog step attenuator; and
    using the determined accuracy of the analog step attenuator to facilitate realization of a predetermined attenuation using both the analog step attenuator and the digital attenuator.

2. The method of claim 1 wherein the digital attenuator determines the actual sizes of the analog steps as the analog step attenuator is stepped through a range of attenuation levels.

3. The method of claim 1 further comprising:
    applying the determined accuracy to maximize the use of the analog step attenuator to allow the digital attenuator to further increase attenuation granularity.

4. The method of claim 1 wherein the calibrating further comprises:
    changing a level of a generated signal by a programmable value in the digital attenuator;
    producing an analog signal in a digital to analog converter (DAC) that is a function of the digital input;
    changing the level of the signal in the analog step attenuator by a predetermined amount;
    determining a digital equivalent of the signal output from the DAC; and
    comparing the level of the digital equivalent to the level of the generated signal, the comparison providing an actual change in attenuation caused by the analog step attenuator, the actual change in attenuation indicative of the accuracy in attenuation of the analog step attenuator.

5. The method of 4 wherein calibrating further comprises minimizing spurious out-of-band signals generated by transmitter power changes.

6. The method of claim 1 wherein the calibrating is a chosen function of a calibration control block, the calibration control block providing signal selection and input signal to one or more multiplexers, at least one of the multiplexers a selection that passes a digital value created by the calibration control block to the digital attenuator.

7. The method of claim 6 wherein at least one multiplexer is coupled to enable a delay that functions to apply changes in attenuation realized in the digital attenuator and the analog step attenuator to the signal at the same point to avoid large transient changes at the output of the filter in attenuation.

8. The method of claim 6 wherein the input signal from the calibration control block is coupled to a storage block configured to store results of calibration.

9. The method of claim 8 wherein the storage block is a look up table, the results of calibration being thresholds for operation of attenuation by both the analog step attenuator and the digital attenuator.

10. The method of claim 1 further comprising:
    changing the digital attenuation until a resulting signal level is within a predetermined tolerance of a second signal level; and
    storing the amount of change in the digital attenuator in a look up table.

11. The method of claim 1 wherein the transmit signals are part of a wideband wireless communication system.

12. A method for achieving a change in attenuation, the method comprising:
applying smaller increments of attenuation to a digital attenuator relative to known increments of attenuation capable in an analog step attenuator;
comparing a resulting change in attenuation to a predetermined attenuation threshold; and
changing attenuation of an analog step attenuator and the digital attenuator according to the predetermined attenuation threshold.

13. The method of claim 12 wherein the changing attenuation continues until a predetermined desired attenuation is reached.

14. The method of claim 12 wherein the change in attenuation is a requested change, a ramp control block receiving the change request and altering the request into a series of small steps that realizes the requested change.

15. The method of claim 14 wherein the requested change is accommodated by changing the digital attenuation until the change reaches a value that can be accommodated by the analog step attenuator, the analog step attenuator using step sizes determined during a calibration mode.

16. The method of claim 14 wherein the ramp control block is configured to be coupled to a storage block of predetermined step sizes.

17. The method of claim 16 wherein the storage block is a look up table, the predetermined step sizes being the series of small steps to avoid spectral distortion.

18. A digital signal processor comprising:
a signal generation unit coupled to an input multiplexer, the input multiplexer configured to receive a digital modulated signal;
a digital attenuator coupled to the input multiplexer, the digital attenuator configured to provide an attenuated signal to a digital-to-analog converter and an analog step attenuator outside the digital signal processor;
a closed loop calibration control block configured to receive a signal output from a baseband filter, the baseband filter configured to receive the analog signal output from the analog step attenuator;
a storage block configured to receive control signals from the closed loop calibration control block, the storage block providing a calibrated step size indicative of an accuracy in attenuation of the analog step attenuator; and
an open loop ramp up/down control block coupled to the storage block to apply the determined accuracy of the analog step attenuator to facilitate realization of a predetermined desired attenuation using both the analog step attenuator and the digital attenuator.

19. The digital signal processor of claim 18 wherein the storage block is a look up table.

20. The digital signal processor of claim 18 wherein the calibrated step size enables the analog step attenuator to address any additional attenuation required.

21. The digital signal processor of claim 18 wherein a digital signal controls an attenuation level realized in the analog step attenuator by controlling switches that select different configurations of resistors in a resistive dividing network.

22. An integrated circuit comprising:
a signal generation unit coupled to an input multiplexer, the input multiplexer configured to receive a digital modulated signal;
a digital attenuator coupled to the input multiplexer, the digital attenuator configured to provide an attenuated signal to a digital-to-analog converter and an analog step attenuator outside the digital signal processor;
a closed loop calibration control block configured to receive a signal output from a baseband filter, the baseband filter configured to receive the analog signal output from the analog step attenuator;
a storage block configured to receive control signals from the closed loop calibration control block, the storage block providing a calibrated step size indicative of an accuracy in attenuation of the analog step attenuator; and
an open loop ramp up/down control block coupled to the storage block to apply the determined accuracy of the analog step attenuator to facilitate realization of a predetermined desired attenuation using both the analog step attenuator and the digital attenuator.

23. A system for attenuating a signal, the system comprising:
a plurality of calibration components; and
a plurality of operating components including at least a digital attenuator and an analog step attenuator, the plurality of operating components coupled to the calibration components, the operating components including one or more of the calibration components, the operating components operable during a normal mode, the operating components configured to apply smaller increments of attenuation to the digital attenuator relative to known increments of attenuation capable in the analog step attenuator, one or more of the operating components configured to compare a resulting change in attenuation to a predetermined attenuation threshold determined by one or more of the calibration components, the operating components configured to change attenuation of the analog step attenuator and the digital attenuator according to the predetermined attenuation threshold.

* * * * *